US010095638B2

(12) United States Patent
Sanuki

(10) Patent No.: US 10,095,638 B2
(45) Date of Patent: Oct. 9, 2018

(54) MEMORY SYSTEM CAPABLE OF WIRELESS COMMUNICATION AND METHOD OF CONTROLLING MEMORY SYSTEM

(71) Applicant: Toshiba Memory Corporation, Minato-ku (JP)

(72) Inventor: Yuichiro Sanuki, Urayasu (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 293 days.

(21) Appl. No.: 14/602,646

(22) Filed: Jan. 22, 2015

(65) Prior Publication Data

US 2016/0062922 A1 Mar. 3, 2016

Related U.S. Application Data

(60) Provisional application No. 62/044,663, filed on Sep. 2, 2014.

(51) Int. Cl.
*G06F 12/14* (2006.01)
*H04W 12/08* (2009.01)
*G06F 3/06* (2006.01)

(52) U.S. Cl.
CPC ........ *G06F 12/1483* (2013.01); *G06F 3/0622* (2013.01); *G06F 3/0637* (2013.01); *G06F 3/0688* (2013.01); *G06F 12/1433* (2013.01); *H04W 12/08* (2013.01); *G06F 2212/1052* (2013.01); *G06F 2212/154* (2013.01); *G06F 2212/2022* (2013.01)

(58) Field of Classification Search
CPC .... G06F 3/0622; G06F 3/0637; G06F 3/0688; G06F 12/1483; H04W 12/08; H04W 76/02; H04W 8/005
USPC ........... 726/2–7, 26; 713/168; 370/241, 254, 370/328, 338
See application file for complete search history.

(56) References Cited

U.S. PATENT DOCUMENTS 7,768,959 B1 * 8/2010 Chen ..................... H04W 88/10 370/310
8,380,168 B2 2/2013 Tanaka et al.
(Continued)

FOREIGN PATENT DOCUMENTS

JP 2006-5397 1/2006
JP 2006-67174 3/2006
(Continued)

OTHER PUBLICATIONS

U.S. Appl. No. 14/193,551, filed Feb. 28, 2014, Hiroko Okabayashi.

*Primary Examiner* — Shanto Abedin
(74) *Attorney, Agent, or Firm* — Oblon, McClelland, Maier & Neustadt, L.L.P.

(57) ABSTRACT

According to one embodiment, a memory controller allows access to a first non-volatile memory from a host device when a wireless communication unit is communicable or communicating with any one of wireless communication devices, and denies access to the first non-volatile memory from the host device when the wireless communication unit is not communicable or communicating with any one of the wireless communication devices. The memory controller does not allow the host device to access information in the first non-volatile memory after the access field specification information is updated.

14 Claims, 8 Drawing Sheets

(56) References Cited

U.S. PATENT DOCUMENTS

2004/0089717 A1* 5/2004 Harari ................... G06F 13/387 235/441
2004/0095916 A1* 5/2004 Maki ....................... H04L 67/30 370/338
2004/0246915 A1* 12/2004 Watanabe ............. H04W 48/20 370/313
2005/0102232 A1* 5/2005 Okabayashi ........... G06Q 30/04 705/41
2006/0045272 A1* 3/2006 Ohaka ................... H04L 9/3271 380/270
2007/0147318 A1* 6/2007 Ross ..................... H04L 63/104 370/338
2009/0024805 A1* 1/2009 Peterson .............. G06Q 20/123 711/153
2009/0070861 A1* 3/2009 Jain .................. G06K 19/07739 726/5
2009/0137228 A1* 5/2009 Horn ..................... H04W 48/02 455/411
2012/0233679 A1* 9/2012 Shedrinsky ........... G06F 19/327 726/7
2012/0257603 A1* 10/2012 Mercier ................ H04W 24/02 370/338
2013/0272284 A1* 10/2013 Tsumagari .......... H04W 76/023 370/338
2013/0290602 A1* 10/2013 Chu .................... G06F 13/1684 711/103
2013/0315098 A1* 11/2013 Bombacino ........... H04W 48/08 370/254
2014/0171078 A1* 6/2014 Ryerson ................ H04W 48/18 455/435.2
2014/0181365 A1* 6/2014 Fanning .............. G06F 12/0246 711/103
2014/0307725 A1* 10/2014 Yoon ................... H04L 43/0811 370/338

FOREIGN PATENT DOCUMENTS

JP 3887654 2/2007
JP 2007-133689 5/2007

* cited by examiner

| ACCESS POINT IDENTIFICATION INFORMATION | CONNECTABLE/ NON-CONNECTABLE STATE |
| --- | --- |
| ACCESS POINT ID-(1) | MARK |
| ACCESS POINT ID-(2) | MARK |
| ACCESS POINT ID-(3) | MARK |

MEMORY SYSTEM CAPABLE OF WIRELESS COMMUNICATION AND METHOD OF CONTROLLING MEMORY SYSTEM

CROSS-REFERENCE TO RELATED APPLICATIONS

This application is based upon and claims the benefit of priority from U.S. Provisional Application No. 62/044,663, filed on Sep. 2, 2014; the entire contents of which are incorporated herein by reference.

FIELD

Embodiments described herein relate generally to a memory system capable of wireless communication and a method of controlling the memory system.

BACKGROUND

Portable memory systems including USB (Universal Serial Bus) memories and SD cards are used in a wide range of fields due to their convenience. Due to the ease of portability, there is a concern that highly confidential data may be taken out of companies using portable memory systems. However, conventionally, there is no proposition of prevention measures against taking out of data using portable memory systems.

DETAILED DESCRIPTION

In general, according to one embodiment, there is provided a memory system capable of wireless communication that includes a wireless communication unit, a first non-volatile memory, a second non-volatile memory, and a memory controller. The second non-volatile memory stores access field specification information including wireless communication device identification information that identifies one or more wireless communication devices. The memory controller controls data access between a host device and the first non-volatile memory and manages a wireless connection state of the wireless communication unit. The memory controller allows access to the first non-volatile memory from the host device when the wireless communication unit is communicable or communicating with any one of the wireless communication devices. The memory controller denies access to the first non-volatile memory from the host device when the wireless communication unit is not communicable or communicating with any one of the wireless communication devices. And the memory controller does not allow the host device to access information in the first non-volatile memory after the access field specification information is updated.

Memory systems capable of wireless communication and methods of controlling the memory systems, according to embodiments will be explained below in detail with reference to the accompanying drawings. Note that the present invention is not limited to the embodiments.

First Embodiment

Figure 1:
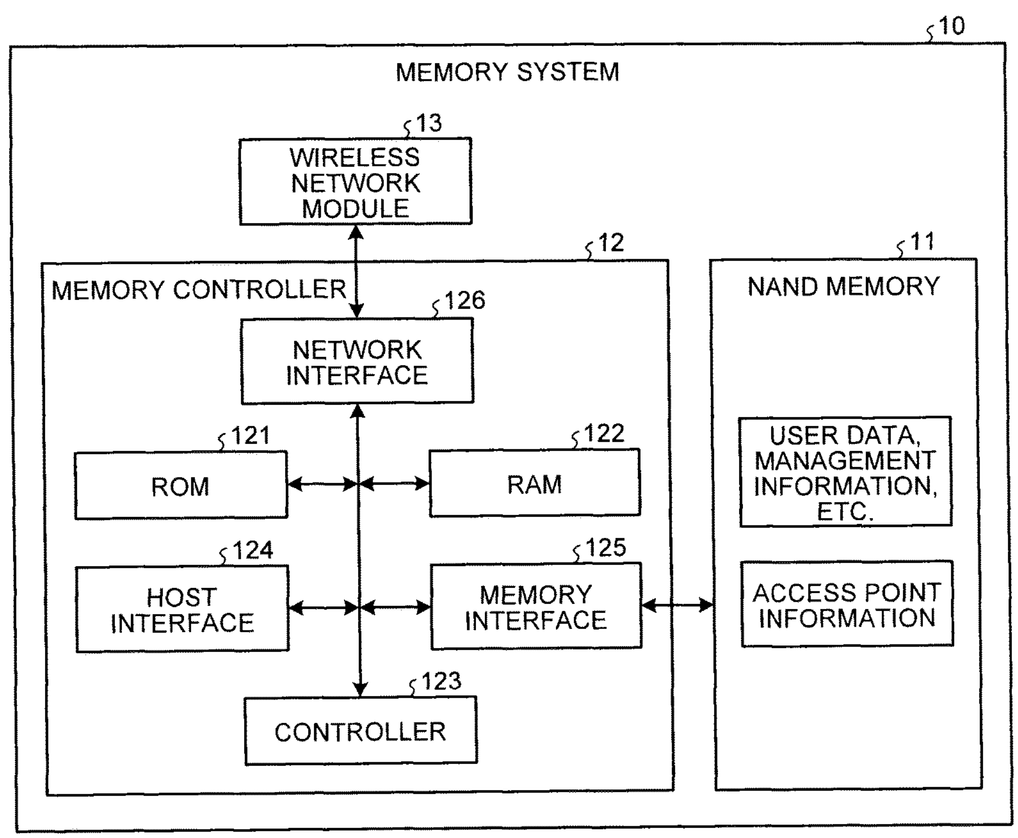
FIG. 1 is a block diagram schematically illustrating an example of a configuration of a memory system capable of wireless communication according to a first embodiment.

FIG. 1 is a block diagram schematically illustrating an example of a configuration of a memory system capable of wireless communication according to a first embodiment. This example uses a memory system 10 that includes a NAND flash memory (hereinafter, referred to as a NAND memory) 11 as a storage medium and that has a wireless communication function compatible with wireless LAN (Local Area Network) standards such as IEEE 802.11ac, IEEE 802.11n, IEEE 802.11a, IEEE 802.11g, and IEEE 802.11b. The wireless communication function is not limited to the wireless LAN standards as long as identification information is issued between the memory system 10 and a wireless communication means on the other end with which the memory system 10 performs wireless communication. For example, a near-field wireless communication function such as an NFC (Near Field Communication) standard or Transfer Jet may be used. In addition, the storage medium may be any as long as the storage medium can store information in a non-volatile manner, and a magnetic disk or the like may be used in addition to the NAND memory 11. As such a memory system 10, a memory card, a USB memory, and a cassette HDD (Hard Disk Drive), for example, can be exemplified.

The memory system 10 includes the NAND memory 11, a memory controller 12, and a wireless network module 13.

When the memory system 10 is connected to a host device, data including user data and management information is stored in the NAND memory 11. The user data is data, the saving of which is specified by the host device. The management information is information such as logical-physical conversion information indicating a mapping between logical addresses used by the host device and physical addresses of the NAND memory 11 used by the memory system 10. The NAND memory 11 is composed of one or a plurality of memory chips. A memory chip has a memory cell array where a plurality of memory cells is arranged in a matrix shape. Each memory cell may have a structure capable of storing data of one bit or may have a structure capable of storing data of two bits or more. Each memory chip has a plurality of physical blocks arranged therein, each physical block being a data erasing unit. One physical block includes a plurality of physical pages. In the NAND memory 11, data write and data read are executed per physical page.

In addition, the NAND memory 11 stores access point information. The access point information is access field specification information in which a field accessible to the memory system 10 is defined using access points. Specifically, the access point information indicates an access point with which the wireless network module 13 can perform wireless communication.

Figures 2, 3:
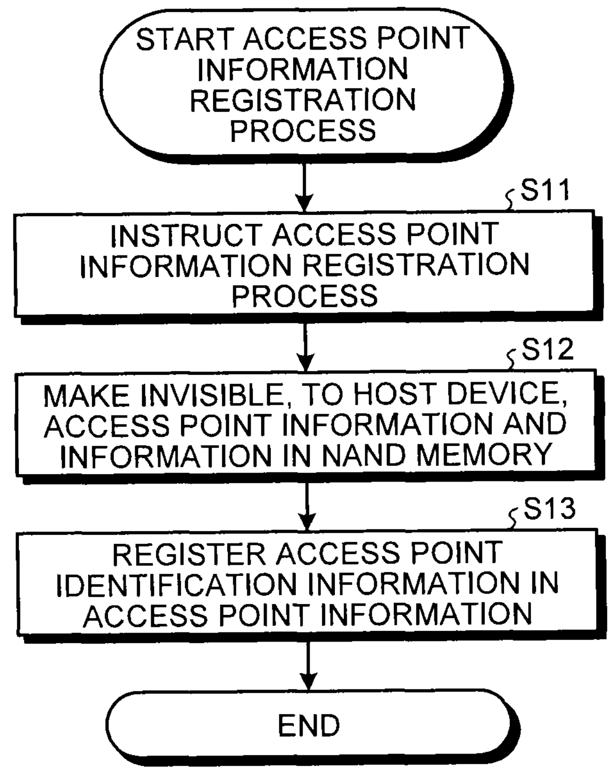
FIG. 2 is a diagram illustrating an example of access point information according to the first embodiment.
FIG. 3 is a flowchart illustrating an example of the steps of an access point information registration process according to the first embodiment.

FIG. 2 is a diagram illustrating an example of access point information according to the first embodiment. The access point information includes access point identification information and a connectable/non-connectable state. The access point identification information is information that identifies an access point accessible by the memory system 10. As the access point identification information, for example, an SSID (Service Set Identifier) can be used. The connectable/non-connectable state is information indicating whether the memory system 10 enters a communication area of the access point indicated by the access point identification information. When the memory system 10 enters a communication area of a given registered access point, the connectable/non-connectable state of corresponding this access point identification information is set to “connectable”. When the memory system 10 has not entered a communication area of a given registered access point, the connectable/non-connectable state of corresponding this access point identification information is set to “non-connectable”. Note that, although writing from the host device can be performed in an area of the NAND memory 11 where the access point information is stored, it is desirable that reading to the host device not be allowed.

The memory controller 12 is disposed between a host device (not illustrated) and the NAND memory 11. The memory controller 12 performs processes including a command process, an access control process, an access point state update process, and an access point information registration process.

The command process is a process performed in response to various types of commands received from the host device when the memory system 10 is connected to the host device. The command process includes, for example, the process of reading data from the NAND memory 11 and the process of writing data to the NAND memory 11. In the command process, the management information is used. The process of updating the management information is also included in the command process.

The access control process is the process of controlling access to the NAND memory 11 from the host device, according to the connectable/non-connectable states of access point identification information in the access point information. Specifically, when the access point information has no access point identification information with “connectable”, the memory controller 12 denies access to the NAND memory 11 from the host device. In this case, the memory controller 12 returns an “access denied” response in response to the various types of commands received from the host device. On the other hand, when the access point information has access point identification information with “connectable”, the memory controller 12 allows access to the NAND memory 11 from the host device.

The access point state update process is the process of changing a connectable/non-connectable state when a change to the connectable/non-connectable state of access point identification information in the access point information is detected by notification from the wireless network module 13. For example, when registered access point identification information with which the wireless network module 13 can establish a wireless connection is received, a corresponding connectable/non-connectable state in the access point information is updated to “connectable”. In addition, when the wireless network module 13 has stopped receiving a signal indicating a wireless connectable state from an access point in a connectable state, the connectable/non-connectable state of corresponding access point identification information is updated to “non-connectable”.

The access point information registration process is the process of registering, in the access point information, an access point with which a wireless connection needs to be established when the host device accesses the memory system 10. In the access point information registration process, when an access point is registered in the access point information, the information in the NAND memory 11 whose access has been restricted so far is made invisible to the host device. Examples of the method of making the information in the NAND memory 11 invisible to the host device include, for example, initializing the NAND memory 11, physically making the NAND memory 11 unable to be used, and restricting access. In addition, not only the information in the NAND memory 11 but also the access point information may be made invisible to the host device. By this, a person who updates an access point cannot access information in the NAND memory 11 unless a wireless connection is established with a registered access point.

The memory controller 12 that performs processes such as those described above includes a ROM (Read Only Memory) 121, a RAM (Random Access Memory) 122, a controller 123, a host interface 124, a memory interface 125, and a network interface 126.

The ROM 121 stores a control program that controls the memory system 10. In the control program, processes including the above-described command process, access control process, access point state update process, and access point information registration process are described.

The RAM 122 is used as a working memory and a buffer memory. For example, when the memory system 10 is activated, the control program in the ROM 121 is read to the working memory. In addition, when an access process to the NAND memory 11 from the host device is performed, data to be accessed is temporarily stored in the buffer memory.

The controller 123 loads, in the RAM 122, the control program included in the ROM 121 and executes the control program.

The host interface 124 performs a communication process between the host device and the memory system 10 (memory controller 12). The memory interface 125 performs a communication process between the memory controller 12 and the NAND memory 11. The network interface 126 performs a communication process between the wireless network module 13 and the memory controller 12.

The wireless network module 13 is a module capable of wireless communication using wireless LAN standards. In the first embodiment, the wireless network module 13 receives a beacon signal which is a control signal to be transmitted from an access point, and passes access point identification information included in the beacon signal to the memory controller 12.

Next, the operation of the memory system 10 capable of wireless communication and having such a structure will be described. In the following, an access point information registration process, an access point state update process, and a data access process will be described one by one.

(Access Point Information Registration Process)

FIG. 3 is a flowchart illustrating an example of the steps of an access point information registration process according to the first embodiment. First, a user connects the memory system 10 to a host device. By this, power is supplied to the memory system 10 and the memory system 10 is activated. Then, in order for the host device to recognize the memory system 10 and place the memory system 10 in an accessible state, the host device performs initialization of the memory system 10. The initialization as used herein is the process of placing the memory space of the NAND memory 11 of the memory system 10 in an accessible state from the host device, and is further the process of placing the memory system 10 in a state of being able to receive commands from the host device.

Thereafter, an access point information registration process is instructed by the user (step S11). For example, an access point information registration process is instructed by a management application for the memory system 10 in the host device. The instruction includes access point identification information of an access point to be registered. When an access point information registration process is instructed, the memory controller 12 makes invisible, to the host device, the access point information and information in the NAND memory 11 (step S12). By this, no access point identification information and no connectable/non-connectable states are being inputted to the access point information. In addition, no data is being saved in the NAND memory 11. Examples of the method of making the information in the NAND memory 11 and the access point information invisible to the host device include, for example, an initialization process, physically making the NAND memory 11 unable to be used, and restricting access. The initialization process may be performed by physically erasing data in the NAND memory 11 for each block or may be performed by initializing only management information without physically erasing blocks where data is stored.

Then, the memory controller 12 registers, in the access point information, the access point identification information included in the instruction (step S13). This is to specify, by a wireless LAN area, a place where access to the memory system 10 can be performed. In the first embodiment, access point identification information is used for specification of a wireless LAN area. There is no limit to the number of pieces of access point identification information to be registered. By this, the process ends.

(Access Point State Update Process)

Figure 4:
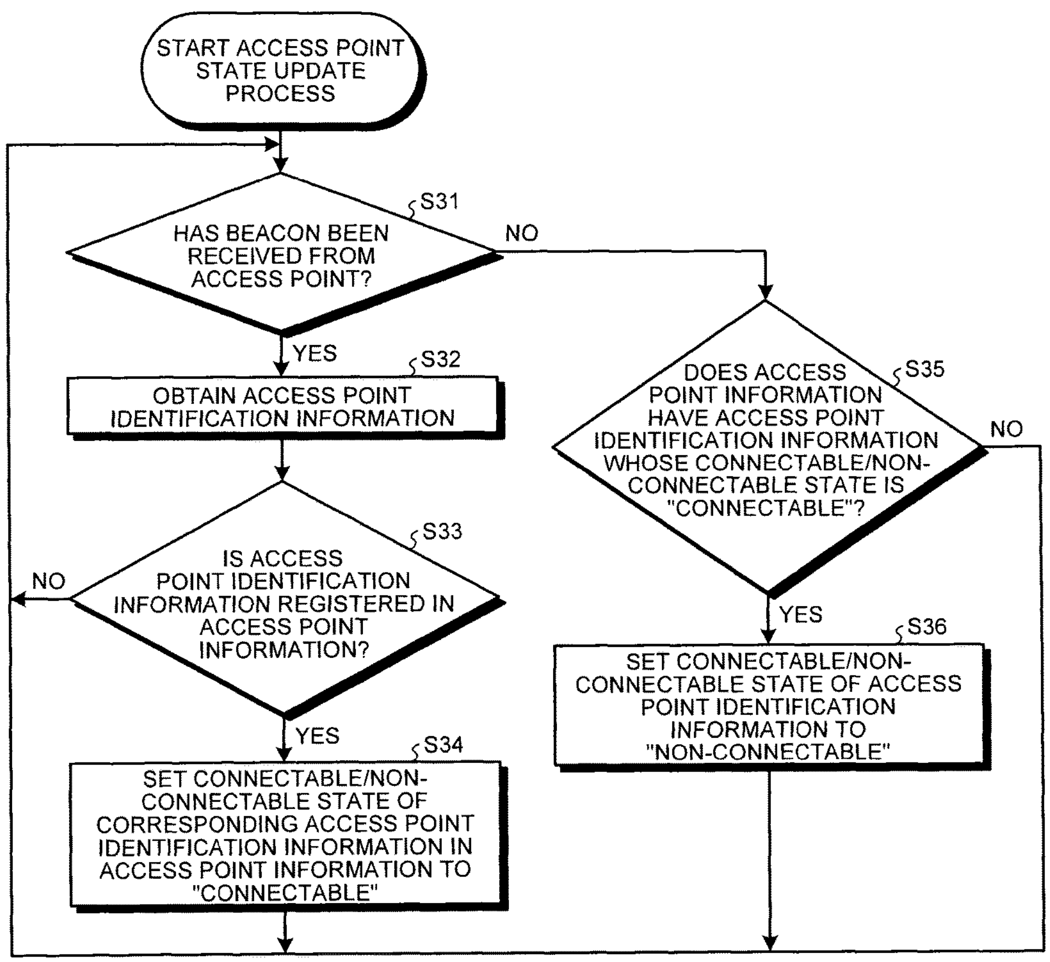
FIG. 4 is a flowchart illustrating an example of the steps of an access point state update process according to the first embodiment.

FIG. 4 is a flowchart illustrating an example of the steps of an access point state update process according to the first embodiment. Note that it is assumed that the memory system 10 is being connected to a host device.

The wireless network module 13 determines whether a beacon has been received from an access point (step S31). The beacon is a control signal which is sent out in a predetermined cycle from the access point, and includes access point identification information. If a beacon has been received (in the case of Yes at step S31), the wireless network module 13 obtains the access point identification information included in the beacon (step S32) and passes the access point identification information to the memory controller 12. The memory controller 12 determines whether the received access point identification information is registered in the access point information (step S33).

If the received access point identification information is registered in the access point information (in the case of Yes at step S33), the memory controller 12 sets the connectable/non-connectable state of corresponding access point identification information in the access point information to "connectable" (step S34). When the connectable/non-connectable state is already set to "connectable", that state is maintained. Then, processing returns to step S31.

On the other hand, if the received access point identification information is not registered in the access point information (in the case of No at step S33), the memory controller 12 does not perform any particular process and returns to step S31.

If a beacon has not been received at step S31 (in the case of No at step S31), the wireless network module 13 does not transmit any information to the memory controller 12. Then, the memory controller 12 determines whether the access point information has access point identification information whose connectable/non-connectable state is "connectable" (step S35). If the access point information has access point identification information whose connectable/non-connectable state is "connectable" (in the case of Yes at step S35), the memory controller 12 sets the connectable/non-connectable state of the access point identification information to "non-connectable" (step S36). Then, processing returns to step S31. If the access point information does not have access point identification information whose connectable/non-connectable state is "connectable" (in the case of No at step S35), processing returns to step S31. Note that by performing such a process in a predetermined cycle, even if the memory controller 12 has not received a beacon from the wireless network module 13 in the process at step S31, the memory controller 12 can perform a process.

The above-described process is performed while the memory system 10 is connected to the host device. Note that in the above description when, in a state of access point identification information being set to "connectable", a beacon has not been received from a corresponding access point once, its connectable/non-connectable state is set to "non-connectable". However, the connectable/non-connectable state may be set to "non-connectable" when it is determined by a plurality of determinations that beacons have not been received continuously, or when a beacon has not been received for a predetermined period of time.

(Data Access Process)

Figure 5:
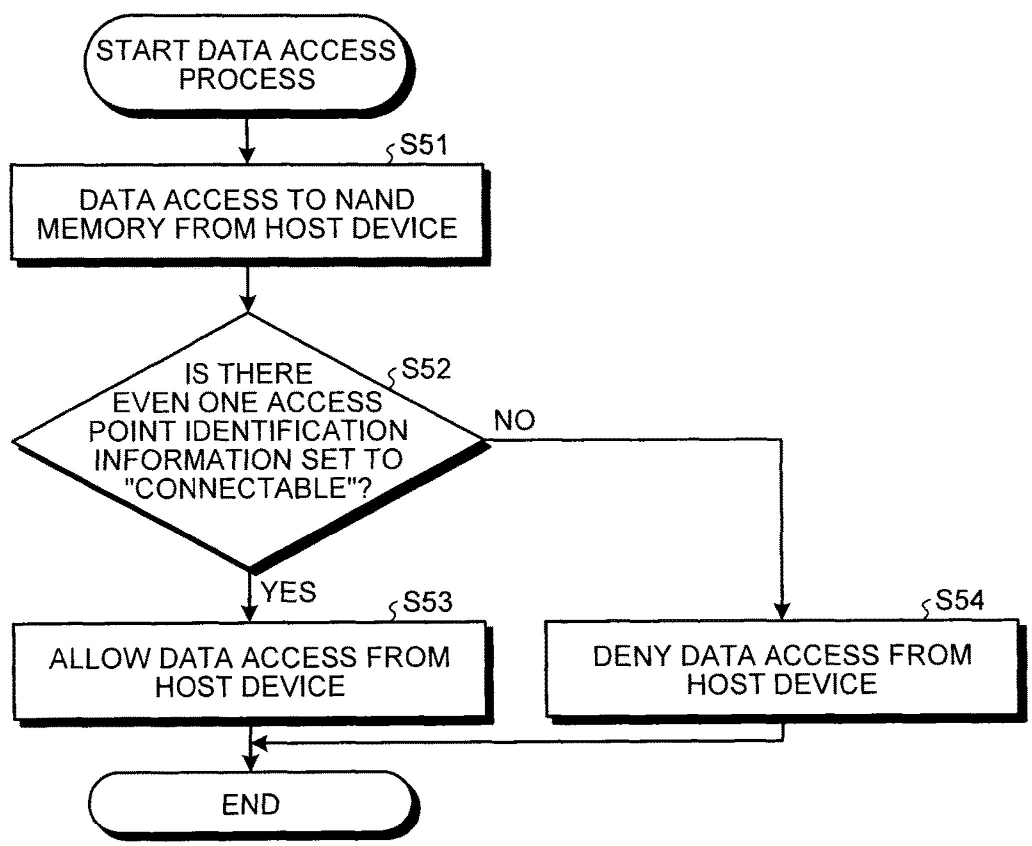
FIG. 5 is a flowchart illustrating an example of the steps of a data access process according to the first embodiment.

FIG. 5 is a flowchart illustrating an example of the steps of a data access process according to the first embodiment. Note that here it is also assumed that the memory system 10 is being connected to a host device.

When there is data access to the NAND memory 11 from the host device (step S51), the memory controller 12 determines whether there is even one access point identification information set to "connectable", by referring to the access point information (step S52). If there is even one access point identification information set to "connectable" (in the case of Yes at step S52), the memory controller 12 allows data access from the host device (step S53). Namely, a command process based on commands from the host device is performed. Then, the process ends.

If there is no access point identification information set to "connectable" (in the case of No at step S52), the memory controller 12 denies data access from the host device (step S54). For example, the memory controller 12 returns a response indicating "access denied" in response to commands from the host device. Then, the process ends.

Figure 6A:
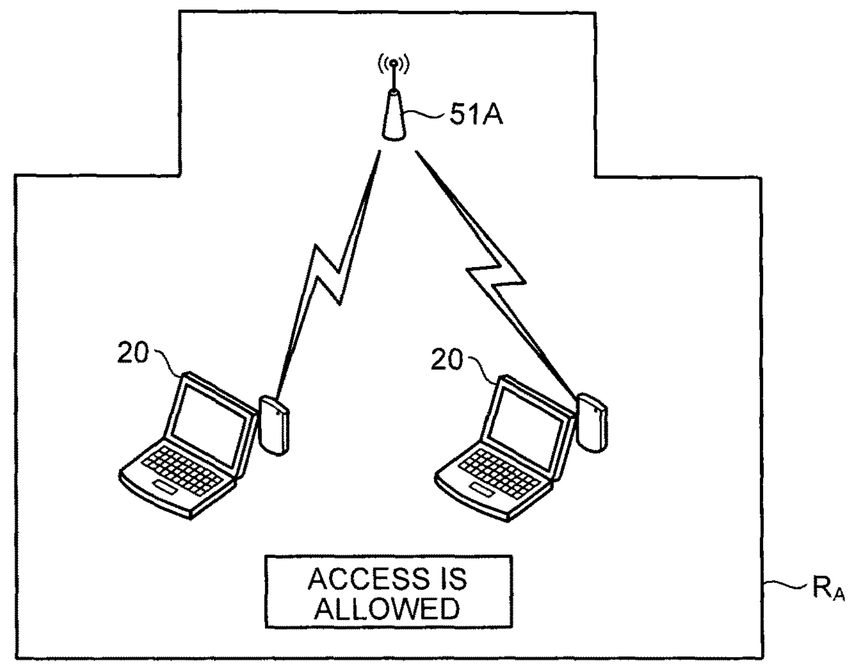
FIGS. 6A and 6B are diagrams schematically illustrating whether to allow or deny data access, according to the first embodiment.
Figure 6B:
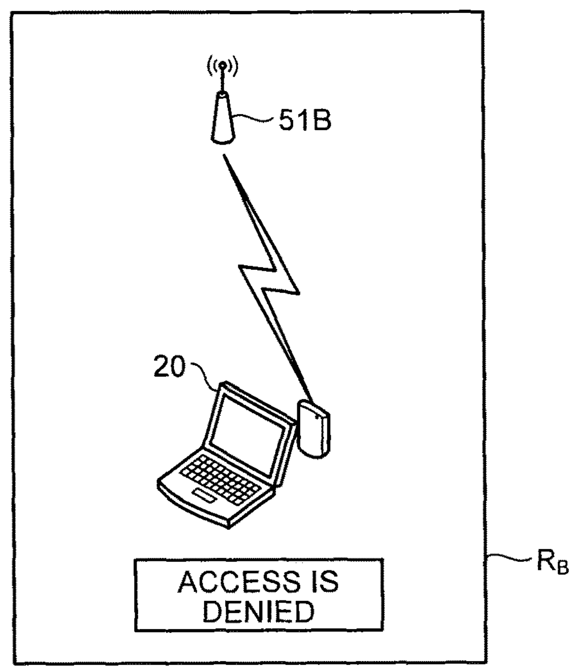

FIGS. 6A and 6B are diagrams schematically illustrating whether to allow or deny data access, according to the first embodiment. FIG. 6A illustrates a case in which data access to the memory system from a host device is allowed. An access point 51A is registered in the access point information. A wireless communicable area of the access point 51A is a region $R_A$. When a host device 20 having the memory system 10 connected thereto is present in the region $R_A$, the host device 20 is allowed to access the memory system 10.

FIG. 6B illustrates a case in which data access to the memory system from a host device is denied. An access point 51B is not registered in the access point information. A wireless communicable area of the access point 51B is a region $R_B$. When a host device 20 having the memory system 10 connected thereto is present in the region $R_B$, even if the memory system 10 is in a wireless connectable state with the access point 51B, access to the memory system 10 from the host device 20 is denied.

In the first embodiment, the wireless network module 13 is provided in the memory system 10, and a physical field where data access to the memory system 10 can be performed is defined by access points registered in the access point information. If, when the memory system 10 is connected to a host device, the memory system 10 is capable of wireless communication at that location with an access point registered in the access point information, access to the NAND memory 11 is allowed. If the memory system 10 is not capable of wireless communication with a registered access point, access to the NAND memory 11 is not allowed. This disables data access to the NAND memory 11 in a place where the memory system 10 is incapable of wireless communication with a registered access point. For example, even if confidential data is taken out of a place where the memory system 10 is capable of wireless communication with a registered access point, reading of the confidential data cannot be performed in a place where the memory system 10 is incapable of wireless communication with a registered access point. Namely, the use place of the memory system 10 can be limited to an approved place. As a result, it is possible to protect taking out of data.

In addition, in the first embodiment, when the access point information is updated, the access point information and the data in the NAND memory 11 are initialized. In a case in which the memory system 10 has been handed over to a third party, even if the third party attempts to add an available access point, the access point information and the data in the NAND memory 11 that have been stored up to that time are erased. Hence, the third party cannot check the data in the memory system 10. That is, it is possible to prevent data leakage to the third party.

Second Embodiment

The first embodiment describes a case in which, when access point information is updated, both of the access point information and a NAND memory are initialized. A second embodiment describes a case in which access point information is updatable.

A memory system 10 according to the second embodiment has the same configuration as that of FIG. 1 described in the first embodiment. Note, however, that in the second embodiment an access point information registration process and a command process which are performed by a memory controller 12 differ from those of the first embodiment. In the access point information registration process, an initialization process for access point information and a NAND memory 11 is not performed and addition of an access point to existing access point information is allowed. In the command process, reading of access point information from a host device is disabled. Hence, when there is access to the access point information, a response indicating that access is not allowed is returned to the host device. Other configurations are the same as those of the first embodiment and thus a description thereof is omitted.

Figure 7:
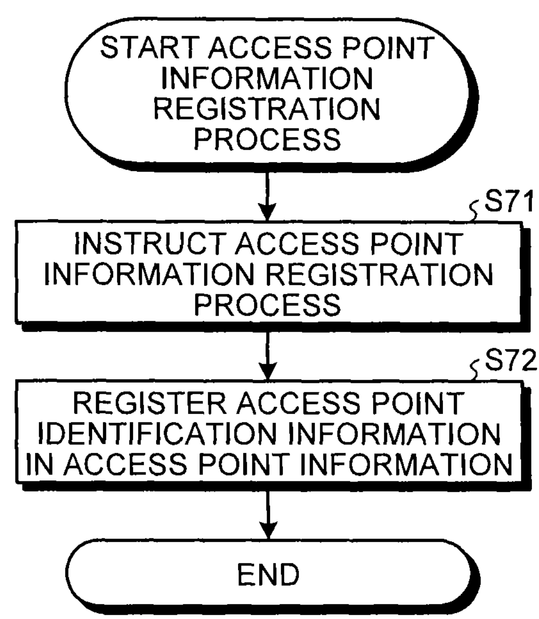
FIG. 7 is a flowchart illustrating an example of the steps of an access point information registration process according to a second embodiment.

The operation of the memory system 10 capable of wireless communication according to the second embodiment is substantially the same as that described in the first embodiment. Note, however, that an access point information registration process differs from that of the first embodiment and thus will be described below. FIG. 7 is a flowchart illustrating an example of the steps of an access point information registration process according to the second embodiment. Note that it is assumed that the memory system 10 is being connected to a host device.

First, an access point information registration process is instructed by a user (step S71). For example, an access point information registration process is instructed by a management application for the memory system 10 in the host device. The instruction for the access point information registration process includes access point identification information to be added.

Then, the memory controller 12 registers, in the access point information, the access point identification information included in the instruction for the access point information registration process (step S72). By this, the process ends.

In the second embodiment, addition of access point identification information to the access point information is allowed and reading of the access point information is not allowed. Since reading of the access point information cannot be performed, even if the memory system 10 has been handed over to a third party, the third party cannot grasp access points and thus cannot read information in the NAND memory 11. In addition, it is premised that an access point information update process cannot be performed unless the memory system 10 is a wireless communicable state with an access point registered in the access point information. Hence, even if the memory system 10 has been handed over to a third party, information in the NAND memory 11 cannot be read easily.

Third Embodiment

In the first and second embodiments, a memory system functions as a client in a server-client system. However, it is also possible to allow the memory system to function as a server.

Figure 8:
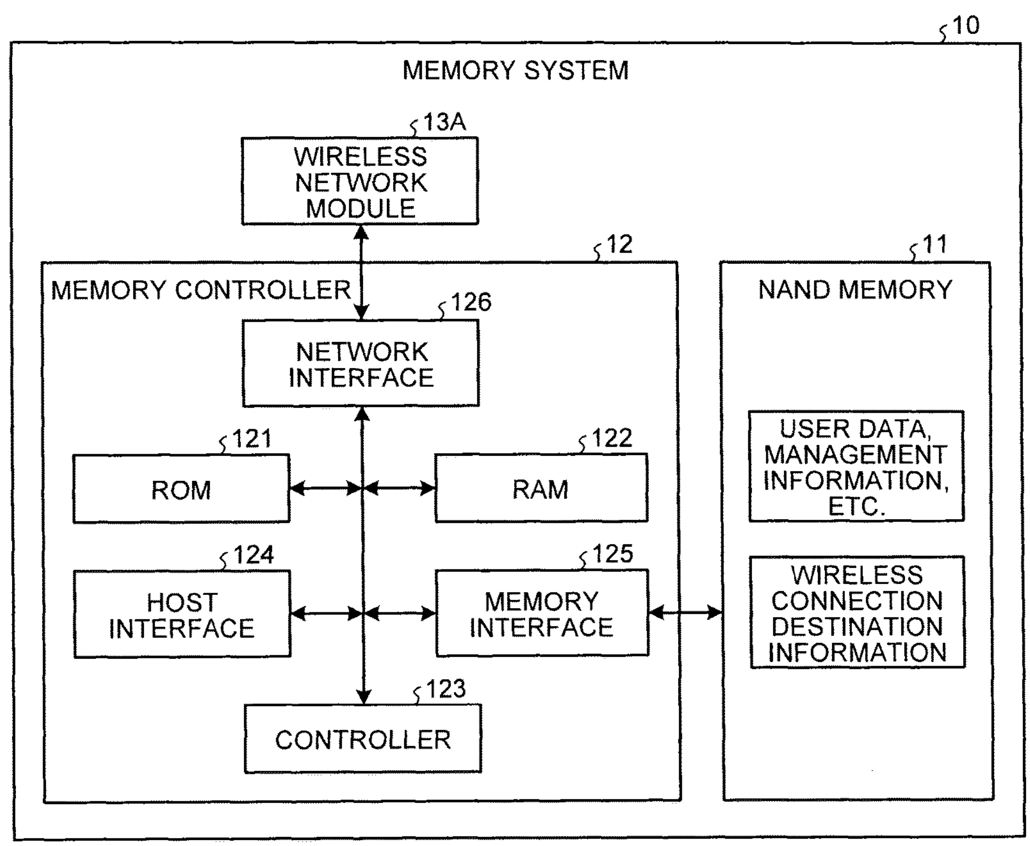
FIG. 8 is a block diagram schematically illustrating an example of a configuration of a memory system capable of wireless communication according to a third embodiment.

FIG. 8 is a block diagram schematically illustrating an example of a configuration of a memory system capable of wireless communication according to a third embodiment. A memory system 10 differs in that wireless connection destination information is stored in a NAND memory 11, instead of access point information of the first embodiment. The wireless connection destination information includes identification information that identifies a wireless communication terminal serving as a client; and a connectable/non-connectable state of the wireless communication terminal indicated by the identification information. As the identification information, for example, a MAC (Media Access Control) address which uniquely identifies a wireless communication terminal serving as a client can be used. The wireless connection destination information is also access field specification information.

In addition, a wireless network module 13A according to the third embodiment also differs in having the function of an access point. The access point sends out, in a predetermined cycle, a beacon indicating that the access point is an access point. In addition, the access point performs an association process and an authentication process with a client that has received a beacon and that desires to establish a wireless LAN connection therewith, and performs a wireless communication process with the client. Furthermore, in order that the wireless network module 13A functions as an access point, the wireless network module 13A also has the function of establishing a connection with a network such as a LAN or the Internet and performing transmission and reception of data between a wirelessly connected client and the network.

A memory controller 12 according to the third embodiment allows data access from a host device only when the memory system 10 is connected to the host device and is in a wireless connectable state with a client registered in the wireless connection destination information.

Note that other configurations are the same as those described in the first embodiment and thus a description thereof is omitted. Note also that the processes performed by the memory system 10 capable of wireless communication are also the same as those described in the first embodiment and thus a description thereof is omitted. Furthermore, although the above-described example describes a case in which the memory system 10 capable of wireless communication and having the structure illustrated in the first embodiment is applied to a server, the memory system 10 capable of wireless communication and having the structure illustrated in the second embodiment may be applied to a server.

In the third embodiment, also, the same effects as those obtained in the first and second embodiments can be obtained.

Note that the above-described embodiments use as an example a case in which the wireless network modules 13 and 13A can perform communication over a wireless LAN. Hence, access point identification information of a wireless base station is registered in access point information, and identification information of a wireless communication terminal is registered in wireless connection destination information. In the case of establishing a wireless connection by other wireless communication schemes, identification information that identifies a terminal or base station on the other end with which the memory system 10 performs wireless communication is registered.

Figure 9:
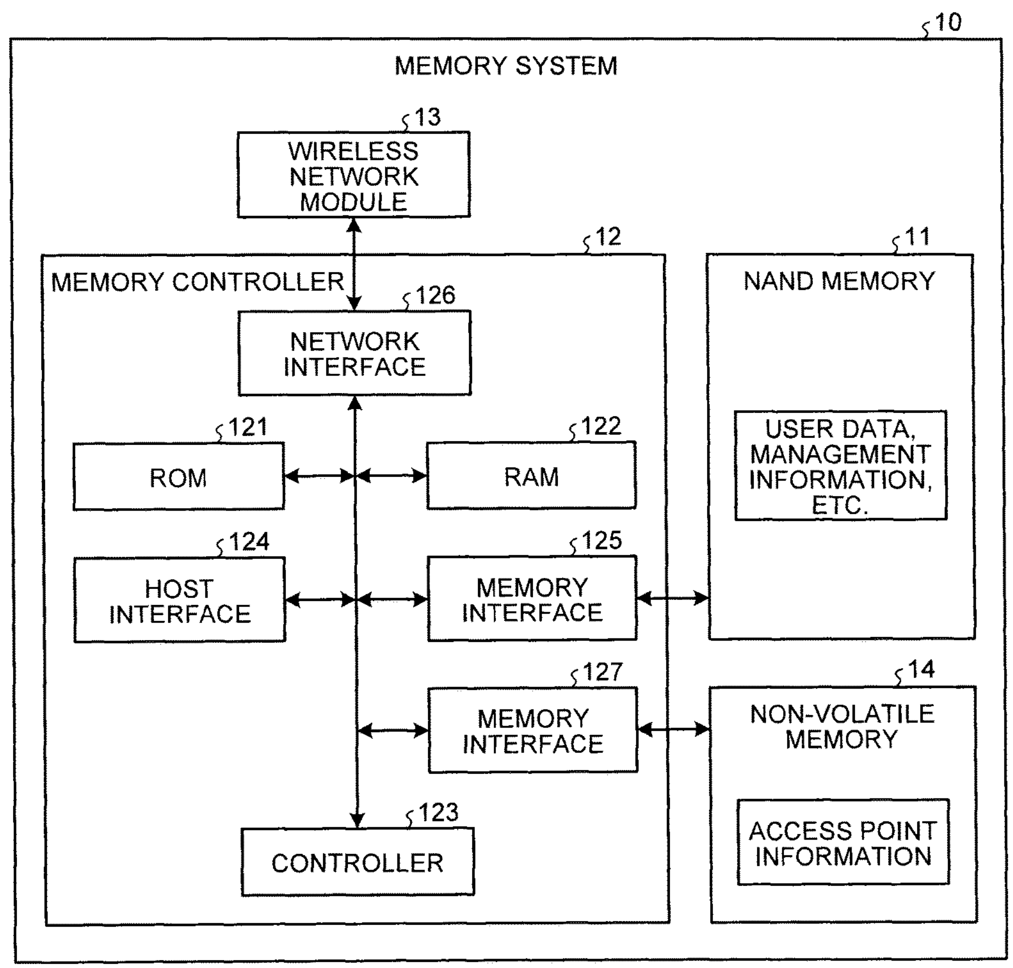
FIG. 9 is a block diagram schematically illustrating another exemplary configuration of a memory system.

In addition, although in the first to third embodiments access point information or wireless connection destination information is saved in the NAND memory 11, the configuration is not limited thereto. FIG. 9 is a block diagram schematically illustrating another exemplary configuration of a memory system. In FIG. 9, a non-volatile memory 14 which is different than a NAND memory 11 is prepared, and access point information or wireless connection destination information is saved in the non-volatile memory 14. As such a non-volatile memory 14, an EEPROM (Electrically Erasable Programmable Read-Only Memory), etc., can be exemplified. In this case, a memory interface 127 for communicating with the non-volatile memory 14 is provided in a memory controller 12. Other components are the same as those described in the first to third embodiments and thus a description thereof is omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system capable of wireless communication comprising:

a wireless communication unit;

a first non-volatile memory;

a second non-volatile memory that stores access field specification information including wireless communication device identification information that identifies one or more wireless communication devices, the wireless communication device identification information being access point identification information that identifies an access point connected to a network and serving as a wireless base station; and a memory controller that controls data access between a host device and the first non-volatile memory and manages a wireless connection state of the wireless communication unit, wherein the memory controller:

allows access to the first non-volatile memory from the host device when the wireless communication unit is communicable or communicating with any one of the wireless communication devices that is registered in the access field specification information, and denies access to the first non-volatile memory from the host device when the wireless communication unit is not communicable or communicating with any one of the wireless communication devices that is registered in the access field specification information, wherein a state that the wireless communication unit is communicable or communicating with any one of the wireless communication devices is a state in which the memory system has entered a wireless communication area of any one of the wireless communication devices or a state in which the memory system is performing wireless communication with any one of the wireless communication devices.

2. The memory system according to claim 1, wherein the access field specification information includes information indicating whether the wireless communication unit is communicable or communicating with any one of the wireless communication devices.

3. The memory system according to claim 1, wherein, after the memory controller updates the access field specification information, the memory controller does not allow the host device to access the access field specification information.

4. The memory system according to claim 1, wherein the first non-volatile memory and the second non-volatile memory are composed of a same memory device.

5. The memory system according to claim 1, wherein the wireless communication unit has a function of an access point connected to a network and performing communication between the wireless communication device and the network.

6. The memory system according to claim 1, wherein the memory controller denies reading from the second non-volatile memory by the host device.

7. The memory system according to claim 1, wherein the memory controller does not allow the host device to access information in the first non-volatile memory after the access field specification information is updated.

8. A memory system capable of wireless communication comprising:

a wireless communication unit;

a first non-volatile memory;

a second non-volatile memory that stores access field specification information including wireless communication device identification information that identifies one or more wireless communication devices, the wireless communication device identification information being access point identification information that identifies an access point connected to a network and serving as a wireless base station; and a memory controller that controls data access between a host device and the first non-volatile memory and manages a wireless connection state of the wireless communication unit, wherein the memory controller:

allows access to the first non-volatile memory from the host device when the wireless communication unit is communicable or communicating with any one of the wireless communication devices that is registered in the access field specification information, and denies access to the first non-volatile memory from the host device when the wireless communication unit is not communicable or communicating with any one of the wireless communication devices that is registered in the access field specification information; and denies reading from the second non-volatile memory by the host device, wherein a state that the wireless communication unit is communicable or communicating with any one of the wireless communication devices is a state in which the memory system has entered a wireless communication area of the access point or a state in which the memory system is performing wireless communication with the access point.

9. The memory system according to claim 8, wherein the access field specification information includes information indicating whether the wireless communication unit is communicable or communicating with any one of the wireless communication devices.

10. The memory system according to claim 8, wherein the first non-volatile memory and the second non-volatile memory are composed of a same storage apparatus.

11. The memory system according to claim 8, wherein the first non-volatile memory is a NAND flash memory or a magnetic disk, and the second non-volatile memory is an EEPROM.

12. The memory system according to claim 8, wherein the wireless communication unit has a function of an access point connected to a network and performing communication between the wireless communication device and the network.

13. A method of controlling a memory system including a wireless communication unit, a first non-volatile memory, and a second non-volatile memory, the method comprising:

receiving an instruction to register one or more wireless communication terminals in access field specification information in the second non-volatile memory, the access field specification information including identification information of the wireless communication terminals, the access field specification information identifying an access point connected to a network and serving as a wireless base station;

receiving an instruction to access the memory system from a host device; and determining whether to allow or deny the access instruction by referring to a connection state between the wireless communication unit and any one of the wireless communication terminals, wherein in the determining whether to allow or deny the access instruction, the access instruction is allowed when the wireless communication unit is communicable or communicating with any one of the wireless communication terminals that is registered in the access field specification information, and the access instruction is denied when the wireless communication unit is not communicable or communicating with any one of the wireless communication terminals that is registered in the access field specification information, wherein a state that the wireless communication unit is communicable or communicating with any one of the wireless communication terminals is a state in which the memory system has entered a wireless communication area of the access point or a state in which the memory system is performing wireless communication with the access point.

14. The method of controlling a memory system according to claim 13, further comprising:

restricting access from the host device to access-restricted information in the first non-volatile memory, the memory system being placed in the host device, wherein in the restricting access to the first non-volatile memory, after the access field specification information is updated, the host device is not allowed to access the access field specification information.

* * * * *